May 26, 1964     L. D. WOODDY, JR     3,134,434
INCREASING ULTIMATE RECOVERY FROM GAS RESERVOIRS
Filed June 19, 1961     3 Sheets-Sheet 1

*INVENTOR.*
LEMUEL D. WOODDY, JR.,
BY
*ATTORNEY.*

COMPARISON OF GAS RECOVERY BY WATER
DRIVE AND BY PRESSURE DEPLETION AND
BY WATER DRIVE PLUS PRESSURE DEPLETION

United States Patent Office 3,134,434
Patented May 26, 1964

1

3,134,434
INCREASING ULTIMATE RECOVERY FROM
GAS RESERVOIRS
Lemuel D. Wooddy, Jr., Houston, Tex., assignor, by mesne assignments, to Jersey Production Research Company, Tulsa, Okla., a corporation of Delaware
Filed June 19, 1961, Ser. No. 118,134
5 Claims. (Cl. 166—9)

The present invention concerns a method for increasing the ultimate recovery from gas reservoirs over that amount that could be produced by pressure depletion alone or by water displacement alone. More particularly, the method combines the two operations by injecting water into the reservoir until all of the gas that can be replaced by water displacement has been produced, and then producing the reservoir gas by pressure depletion to obtain most of the gas which makes up the residual gas saturation after the waterflood phase.

The technique is particularly applicable to associated gas reservoirs, in which gas is held in place to maintain pressure or to prevent migration of oil into the gas cap, to permit the gas to be sold without the loss of gas-cap pressure.

Briefly, the steps of the invention comprise (1) waterflooding the gas reservoir at approximately the original reservoir pressure to residual gas saturation and producing the gas displaced by the water; (2) reducing the reservoir pressure by removing a portion of the water from the reservoir; and (3) then producing the residual gas remaining in the reservoir following the waterflood through pressure depletion of the gas reservoir.

Therefore, it is a foremost object of the present invention to provide a unique method which increases the ultimate recovery of gas from a gas reservoir.

Figure 1:
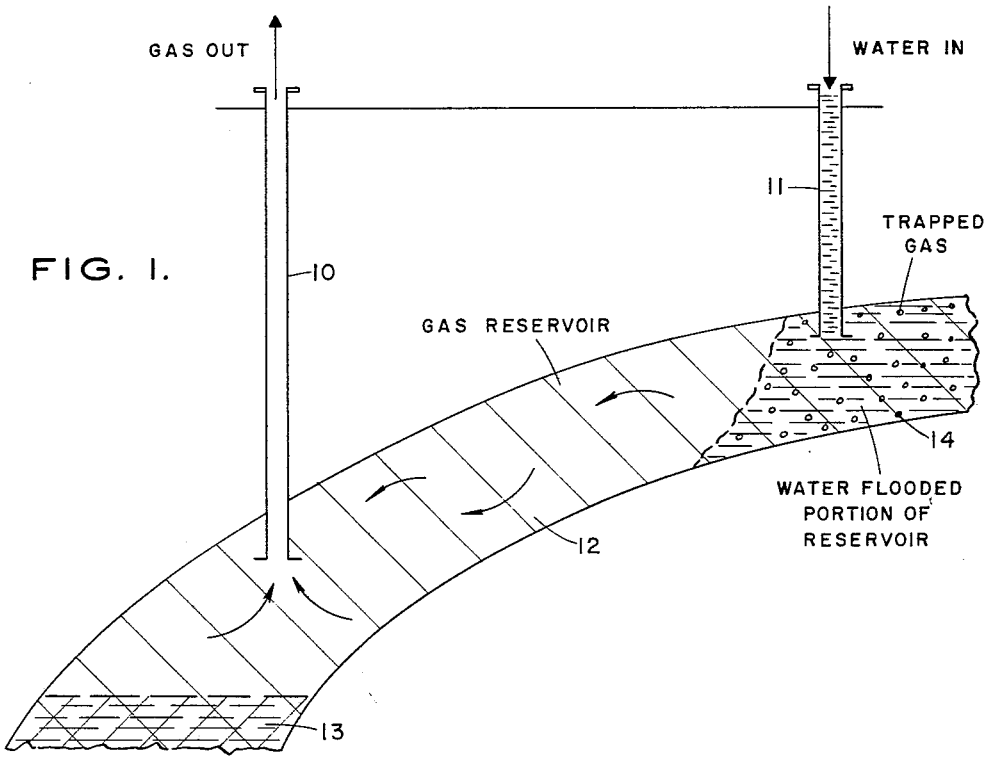
Figure 2:
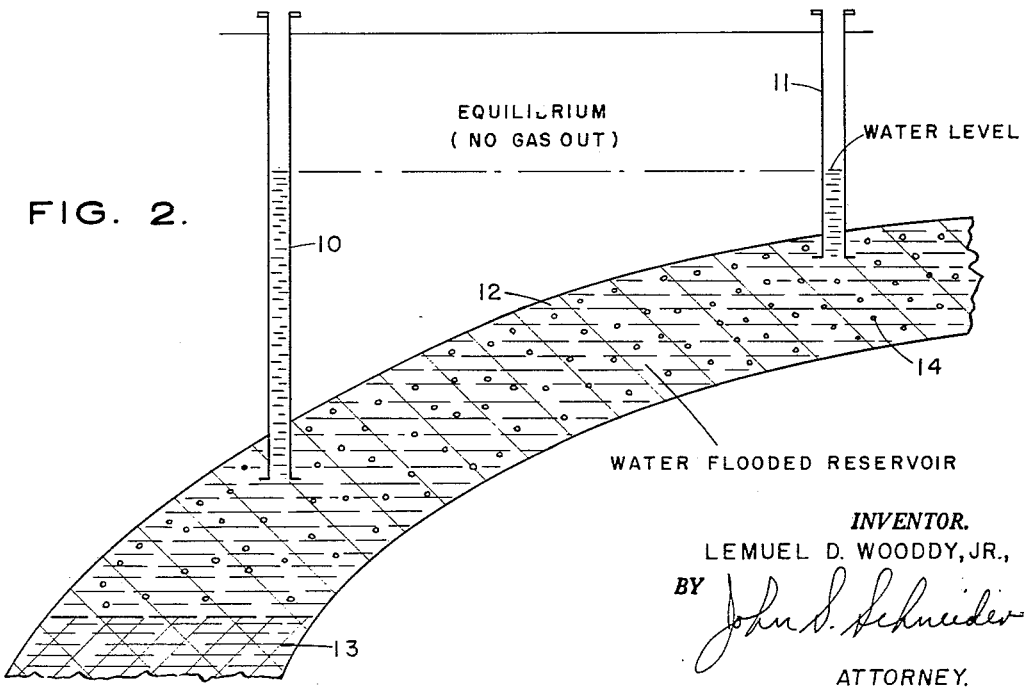
Figure 3:
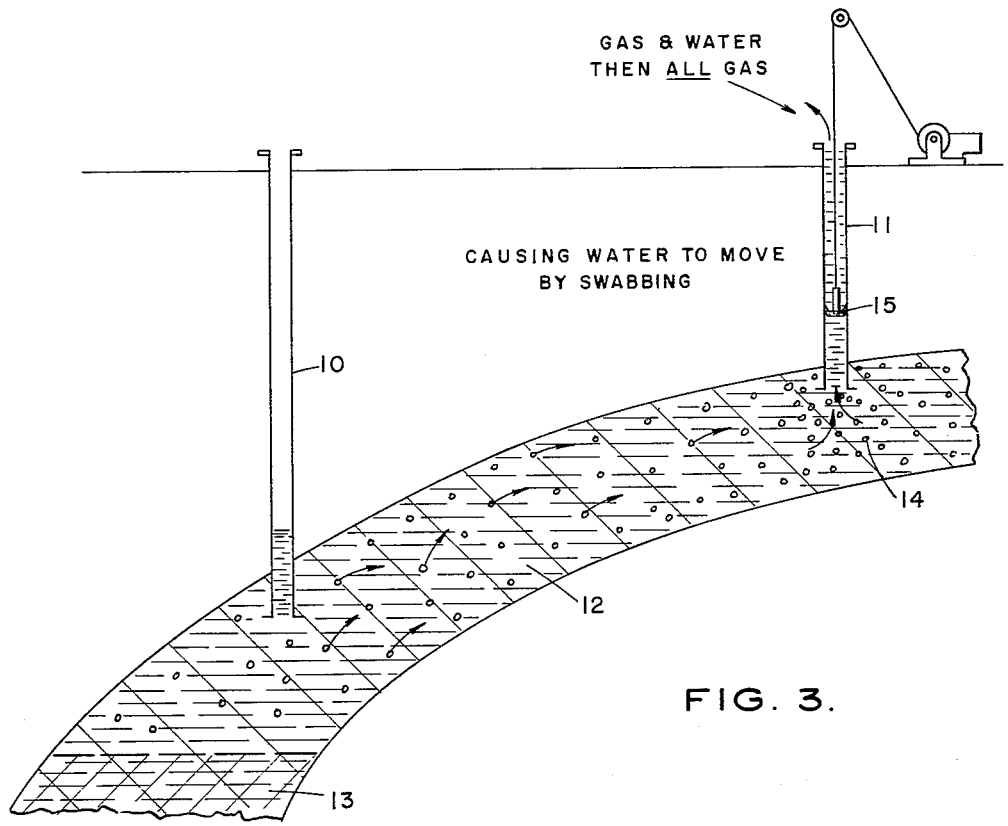
Figure 4:
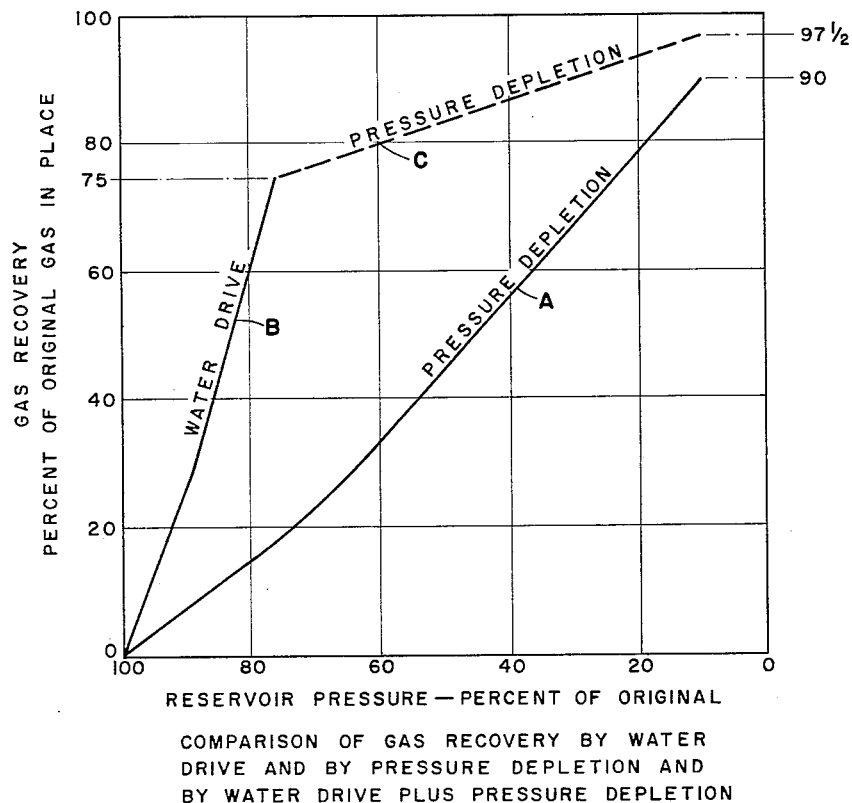

The above and other objects and advantages of the invention will be apparent from a more detailed description thereof when taken with the drawings wherein:

FIGS. 1, 2, and 3 are schematic cross-sectional views of the earth's subsurface showing a gas reservoir penetrated by injection and production wells and illustrating sequential stages in the method of the invention; and FIG. 4 is a graph illustrating the improved ultimate recovery of gas achievable by the method of the invention over that achievable by water drive alone or pressure depletion alone.

As illustrated in FIG. 4, a gas reservoir under normal pressure depletion will in general produce about 90% of the original reserve (curve A). The 10% unproduced gas occupies the original reservoir space at the abandonment pressure. Natural water drive depletion of a gas reservoir, on the other hand, in general will produce only about 75% of the gas because of residual gas left behind the water front and because of gas trapped in unswept areas of the reservoir (curve B). This trapped and residual gas is near the original reservoir pressure and upon completion of the natural water drive is considered unrecoverable.

The third curve in FIG. 4 (dotted curve C) illustrates the improved result obtainable by the technique of first waterflooding the gas reservoir at or about the original reservoir pressure to displace about 75% of the original gas in place and then pressure depleting the reservoir to arrive at an ultimate gas recovery of about 97% of the original gas reserve.

The steps of the method of the invention are illustrated

2 in FIGS. 1–3. In these figures are shown a down-dip well 10 and an up-dip well 11 penetrating a gas reservoir 12, which is in association with an oil reservoir 13. In FIG. 1 water is being injected through well 11 into reservoir 12 to displace gas in the reservoir toward well 10. The globules 14 indicate the gas left behind by the sweeping waterflood.

FIG. 2 depicts the operation following completion of the waterflood. The unproduced gas 14 represents the residual gas saturation which is unable to flow because there is no longer any permeability to gas due to the gas-water saturation relationship. However, the residual gas saturation can be made to flow if the pressure on the reservoir is decreased, thereby enabling the gas to expand and increase its saturation. To decrease pressure on the reservoir, removal of some water from the reservoir through the wells completed therein is necessary.

FIG. 3 illustrates the final water removal-pressure depletion operation. One method of removing water from reservoir 12 is by swabbing water from well 11 with a swabbing tool 15. Since water in incompressible, only a minute fraction of water removed from reservoir 12 serves to reduce the pressure on the reservoir and cause thereby a slight expansion of the residual gas. Once the residual gas expands, the gas saturation increases, and some gas begins to flow, as evidenced by the arrows in FIG. 3. The flowing gas then migrates to the upper part of the reservoir because of gravity segregation and finds its way into the up-dip well 11. Production of this gas from the reservoir contributes to further decline in the reservoir pressure, which in turn causes additional gas expansion and eventually leads to pressure depletion of the entire residual gas saturation to some quite low abandonment pressure.

Although the method of the invention has been illustrated and described relative to employing two wells, 10 and 11, the method may be operated using only one well. In an arrangement of this type, the waterflooding step could be carried out either by alternate injection of water and production of gas or in a dual-completion type arrangement by injecting water through the lower perforations and producing gas from the upper perforations. When a single well is used, it should be located high on the structure for most effective gas displacement.

Having fully described the method, objects, and operation of my invention, I claim:

1. A method for recovery of hydrocarbons from a gas reservoir penetrated by up-dip and down-dip wells comprising the steps of:
    injecting flood water into said reservoir through said up-dip well and producing reservoir gas displaced by said water through said down-dip well until injected water has completely flooded said reservoir to residual gas saturation;
    removing a portion of said flood water which has risen in said wells as a result of said waterflooding step from one of said wells to reduce reservoir pressure; and
    then producing residual gas through one of said wells by pressure depletion of said reservoir.

2. A method as recited in claim 1 in which said residual gas is produced through said up-dip well.

3. A method as recited in claim 2 in which said water and gas are alternately injected and produced.

4. A method for recovery of hydrocarbons from a gas reservoir penetrated by a well high on the structure thereof comprising the steps of:

injecting flood water into said reservoir through said well and producing reservoir gas displaced by said water through said well until injected water has completely flooded said reservoir to residual gas saturation;

removing a portion of said flood water which has risen in said well as a result of said waterflooding step from said well to reduce reservoir pressure; and then producing residual gas through said well by pressure depletion of said reservoir.

5. A method as recited in claim 4 in which said water and gas are alternately injected and produced.

References Cited in the file of this patent
UNITED STATES PATENTS

| | | |
|---|---|---|
| 2,842,204 | Horner | July 8, 1958 |
| 2,896,719 | Hill | July 28, 1959 |